United States Patent
McCoy et al.

(10) Patent No.: US 6,746,038 B2
(45) Date of Patent: *Jun. 8, 2004

(54) MULTI-FIT HITCH ASSEMBLY

(75) Inventors: Richard W. McCoy, Granger, IN (US); Marvin L. Hanson, Vandalia, MI (US)

(73) Assignee: Cequent Towing Products, Inc., Plymouth, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 10/459,272

(22) Filed: Jun. 11, 2003

(65) Prior Publication Data

US 2003/0197348 A1 Oct. 23, 2003

Related U.S. Application Data

(63) Continuation of application No. 10/235,334, filed on Sep. 5, 2002, which is a continuation of application No. 09/865,277, filed on May 25, 2001, now Pat. No. 6,578,864, which is a continuation of application No. 09/431,588, filed on Nov. 1, 1999, now abandoned.

(51) Int. Cl.[7] ................................................ B60D 1/00
(52) U.S. Cl. ..................................... 280/495; 280/491.5
(58) Field of Search ............................. 280/482, 491.1, 280/491.2, 491.5, 495, 507, 511

(56) References Cited

U.S. PATENT DOCUMENTS

| | | | |
|---|---|---|---|
| 2,031,752 A | 2/1936 | Woodruff | |
| 2,148,264 A | 2/1939 | Goodell | |
| 2,569,086 A | 9/1951 | Zenk | |
| 3,140,071 A | 7/1964 | Lorentzen | |
| 3,463,514 A | * 8/1969 | Warner | 280/495 |
| 5,102,156 A | 4/1992 | Fink et al. | |
| 5,149,122 A | 9/1992 | Helber | |
| 5,193,837 A | 3/1993 | Fink et al. | |
| 5,489,111 A | 2/1996 | Collins | |
| 5,511,813 A | * 4/1996 | Kravitz | 280/495 |
| 5,620,198 A | * 4/1997 | Borchers | 280/507 |
| 5,873,594 A | * 2/1999 | McCoy et al. | 280/491.5 |
| 6,139,042 A | * 10/2000 | Tetrick | 280/497 |
| 6,578,864 B2 | * 6/2003 | McCoy et al. | 280/495 |

* cited by examiner

*Primary Examiner*—L. Lum
(74) *Attorney, Agent, or Firm*—King & Schickli, PLLC

(57) ABSTRACT

The present invention relates to a trailer hitch receiver including a cross member, a hitch receiver box carried on the cross member and a pair of opposed mounting brackets. Each of the opposed mounting brackets includes a first mounting arrangement or series of apertures that secures the mounting brackets to the cross member in a first position and a second mounting arrangement or second set of mounting apertures for securing the mounting brackets to main frame member in a second position. Additionally, each mounting bracket includes a notch in the forward edge thereof which provides the necessary clearance for mounting the mounting brackets inboard of mounting flanges carried by the cross member. Accordingly, the mounting brackets may also be mounted in an inboard or outboard position as necessary to meet the needs of any particular application.

12 Claims, 6 Drawing Sheets

MULTI-FIT HITCH ASSEMBLY

This application is a continuation of 10/235,334 filed Sep. 5, 2002, and continuation of pending U.S. patent application Ser. No. 09/865,277 filed May 25, 2001 Pat. No. 6,578,864, which is a continuation of U.S. patent application Ser. No. 09/431,588 filed Nov. 1, 1999 now abandoned.

TECHNICAL FIELD

The present invention relates generally to the towing field and, more particularly, to a multi-fit trailer hitch receiver assembly providing unmatched mounting versatility so as to allow multiple application use.

BACKGROUND OF THE INVENTION

It has long been known to construct trailer hitches that are mounted to vehicles in order to allow the towing of trailers or the like. In recent years, such trailer hitches have been designed to include a central frame member or crossbar carrying mounting brackets at each end thereof for mounting the trailer hitch to the frame of the towing vehicle. The trailer hitches also include a receiver box having a rearwardly directed opening or cavity for the receipt of a hitch or draw bar that carries a hitch ball or other means allowing connection to a trailer. Examples of such a structure include the 35, 36 and 37 series Custom Receivers and Titan 45 series hitch receivers manufactured by Reese Products, Inc., the assignee of the present invention.

In recent years, vehicle manufacturers have offered not only an increasing number of vehicle options but also an increasing number of vehicle models. In order to avoid the manufacturing expense of custom designing and fitting a trailer hitch receiver to each such vehicle model or each model with each available group of equipment options, it is necessary to provide a single hitch receiver with unparalleled mounting versatility to allow mounting to multiple vehicle models and vehicle models equipped with various option packages.

One effort made in the prior art to meet this need is disclosed in U.S. Pat. No. 5,149,122 to Helber. This adjustable hitch assembly allows one to alter the span of the frame mounting points and/or the height of the main frame or cross member. The apparatus is, however, relatively complicated and includes a number of parts to allow adjustability while providing for the mounting of the main frame member. Further, a telescoping tubular construction is used and this introduces substantial play into the arrangement resulting in a detrimental loss in rigidity.

SUMMARY OF THE INVENTION

The present invention relates to a trailer hitch receiver with heretofore unavailable mounting versatility allowing the trailer hitch receiver to be utilized on a number of different vehicle models equipped with various equipment option packages including, for example, special exhaust and suspension systems.

Specifically, the trailer hitch receiver includes selectively positionable mounting brackets adapted to provide enhanced versatility when mounting the trailer hitch receiver to the frame of a towing vehicle. Further, these brackets are relatively low profile, single-piece components that are relatively inexpensive to manufacture and easy to use. Unlike telescoping tubular components that have a relatively wide profile, these mounting brackets provide the necessary clearance to fit in tight areas around vehicle components and, as such, are more functional and suited to many more applications. While allowing the necessary adjustability, the brackets also insure a rigid connection.

Advantageously, the brackets of the trailer hitch receiver may be selectively positioned both fore or aft and inboard or outboard to provide relative adjustment in two perpendicular directions. This ability provides substantial versatility and allows the mounting of the trailer hitch assembly to a wider range of vehicles.

Additional advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a trailer hitch receiver is provided including a main frame member, a hitch receiver box carried on the main frame member and a pair of opposed mounting brackets. Each of the opposed mounting brackets includes a first mounting arrangement that selectively secures the mounting bracket to the main frame member in a first position and a second mounting arrangement that selectively secures the mounting bracket to the main frame member in a second position.

Preferably, the main frame member includes a cross member, a first mounting flange for engaging and holding the first mounting bracket and a second mounting flange for engaging and holding the second mounting bracket. Advantageously, the pair of opposed mounting brackets may be selectively mounted either inboard or outboard of the first and second mounting flanges. A notch is also provided in the peripheral edge of each mounting bracket. That notch provides the necessary clearance around the cross member to allow the inboard mounting of the mounting brackets.

More specifically describing the invention, each of the first and second mounting flanges includes a series of anchoring apertures. Further, the first mounting arrangement preferably comprises a first set of mounting apertures while the second mounting arrangement preferably comprises a second set of mounting apertures a spaced distance from the first set. One or more mounting apertures may be shared by the first and second sets. Additionally, the apparatus further includes fasteners for securing the pair of opposed mounting brackets to the first and second mounting flanges.

Specifically, the mounting brackets are secured either inboard or outboard of the mounting flanges with the anchoring apertures aligned with the first set of mounting apertures in order to secure the brackets in the first selected position. Alternatively, the mounting brackets are secured outboard of the mounting flanges with the anchoring apertures aligned with the second set of mounting apertures in order to secure the mounting brackets in the second mounting position. Once the anchoring apertures are aligned with either of the first or second set of mounting apertures, the fasteners are secured through the aligned apertures in order to complete the connection. Preferably, the fasteners include bolts and cooperating locknuts. It should be appreciated, however, that other appropriate fasteners of a type known in the art may be utilized for this purpose.

Of course, it is the size and shape of the vehicle frame and the presence or absence of various equipment options that determine the proper desired positioning of the mounting brackets on the mounting flanges of the main frame member. Transverse or side to side adjustment is provided by the selective mounting of the brackets either inboard or outboard of the mounting flanges. Additional side to side adjustment is provided by the reversible mounting brackets. Specifically, the mounting skirts on the mounting brackets may extend inward, toward each other or by reversing the brackets outward, away from each other.

Fore and aft adjustment is provided by the selective mounting of the mounting brackets with the anchoring apertures aligned with either the first or second set of mounting apertures. Together, the side to side or transverse and fore and aft or longitudinal adjustment provided by the trailer hitch receiver of the present invention allow a great deal of versatility in mounting the trailer hitch receiver around exhaust and suspension systems of a towing vehicle. They even allow mounting in vehicles of different frame width. Accordingly, a trailer hitch receiver of the present invention may be conveniently and effectively mounted to a wide variety of vehicle models even when those models are equipped with a wide variety of equipment options or accessories. As such, the trailer hitch receiver of the present invention provides multi-fit capability allowing its use for a wide number of towing applications. Of course, since one trailer hitch receiver meets the requirements of numerous applications, it is unnecessary to custom manufacture a hitch receiver for each such application. Thus, manufacturing costs are substantially reduced not only to the benefit of the manufacturer, but also to the ultimate benefit of the purchaser.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principals of the invention. In the drawings.

Reference will now be made in detail to the present preferred embodiment of the invention, an example of which is illustrated in the accompanying drawing.

DETAILED DESCRIPTION OF THE INVENTION

Figure 1:
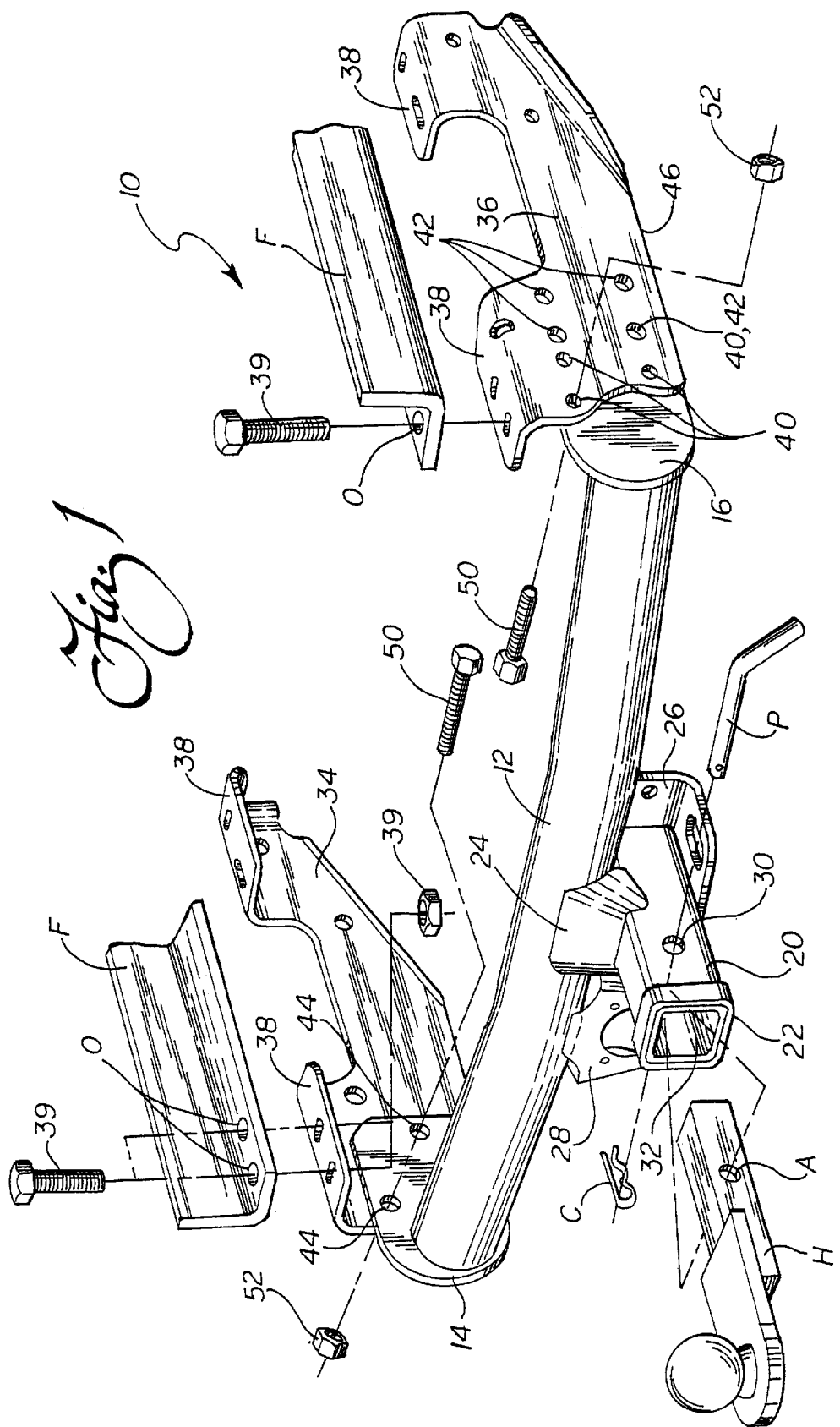
FIG. 1 is a perspective view of the trailer hitch receiver of the present invention with the mounting brackets mounted outboard of the mounting flanges and with the first set of mounting apertures aligned with the anchoring apertures.

Reference is now made to FIG. 1 showing the trailer hitch receiver 10 of the present invention. The trailer hitch receiver 10 includes a main frame member 11 preferably formed from tubular steel material. As clearly illustrated, the main frame member 11 includes a cross member 12 that may have a round cross section. The main frame member 111 also includes a first mounting flange 14 at a first end of the cross member 12 and a second mounting flange 16 at a second end of the cross member. Each mounting flange 14, 16 may be formed from steel plate material. A hitch receiver box assembly 18 is carried at the middle of the main frame member 11 on the cross member 12. The hitch receiver box assembly 18 includes a receiver box 20 formed from a steel torque tube and including a reinforced lip 22. Additionally, the hitch receiver box assembly 18 includes an overlying mounting gusset 24 and a substantially L-shaped chain plate 26. The receiver box 20, gusset 24 and chain plate 26 are all welded together to the cross member 12 for strength and rigidity. Of course, other means of securing the hitch receiver box assembly 18 to the cross member 12 known in the art to be appropriate for this purpose may be utilized. In addition, a bracket 28 for supporting an electrical plug to power the trailer lighting system as well as any electrical trailer braking system may be secured to the chain plate 26 and/or the cross member 12 (as shown) in a manner well known in the art.

As should be further appreciated from FIG. 1, the receiver box 20 includes aligned cooperating apertures 30 in the sidewalls thereof (only one shown in FIG. 1). As is known in the art, a hitch or tow bar H is inserted in the rearward opening cavity 32 until a through aperture A in the hitch bar is aligned with the apertures 30 in the receiver box 20. A connecting pin P is then inserted through the aligned apertures 30 in the receiver box 20 and the aperture A in the hitch bar H. A pin clip C is then secured to the projecting end of the connecting pin P to secure the connecting pin in position and, therefore, the hitch bar H in the receiver box 20.

The trailer hitch receiver 10 is mounted to the towing vehicle by means of first and second mounting brackets 34, 36. Each mounting bracket 34, 36 is formed from a single piece of sheet metal that is forged or otherwise machined so as to provide at least in part two planar surfaces extending substantially perpendicular to one another; that is, a substantially L-shape in cross-section. In this way each mounting bracket 34, 36 includes at least one integral mounting skirt 38. In the embodiment illustrated, each mounting bracket 34, 36 includes a pair of spaced, integral mounting skirts 38. Each mounting skirt 38 includes a pair of openings 37 through which fasteners 39 may be utilized to secure the mounting brackets 34, 36 through cooperating openings O drilled in the frame F of the towing vehicle.

Figure 2:
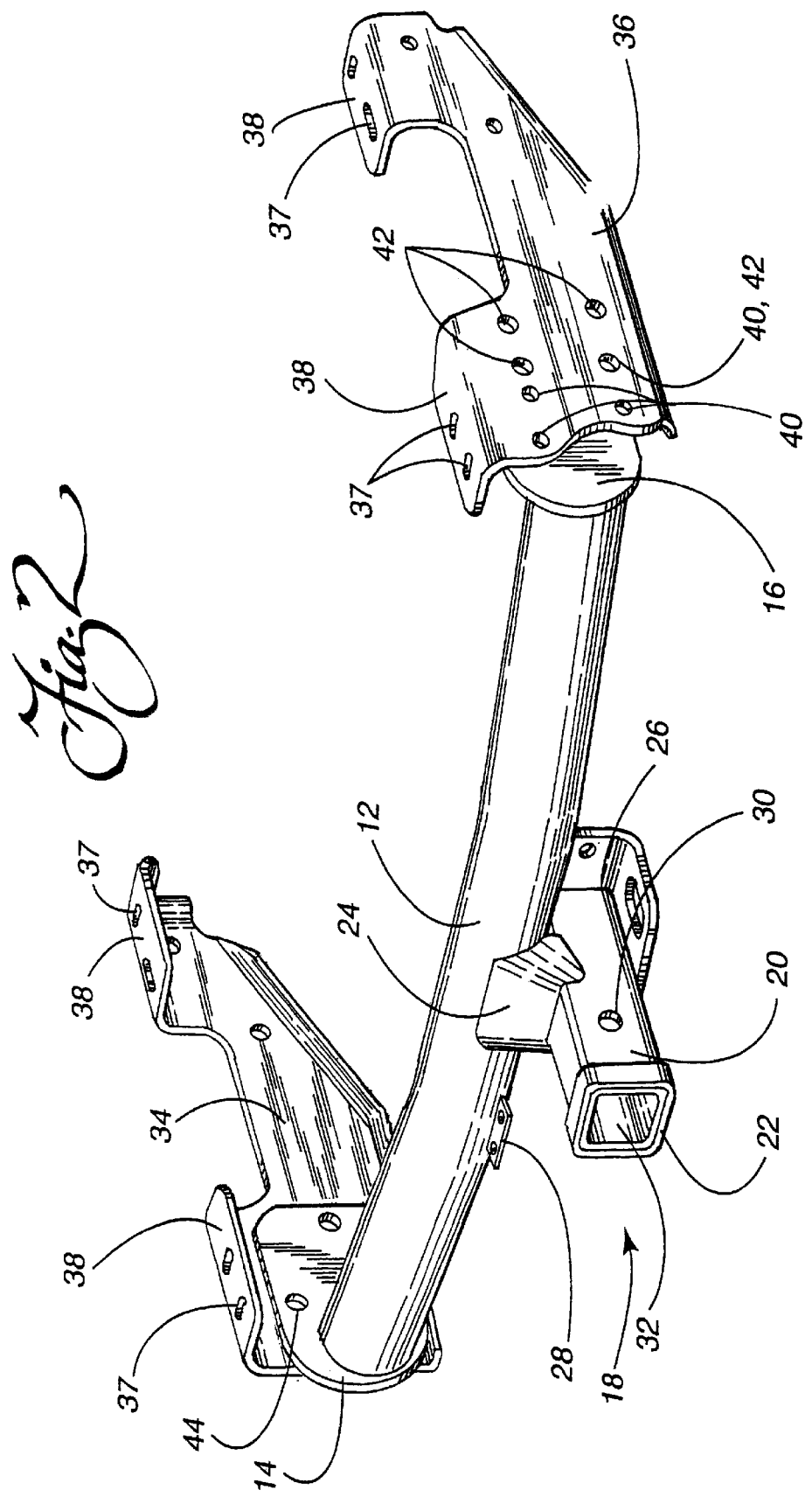
FIG. 2 is a perspective view of the trailer hitch receiver of the present invention with the mounting brackets mounted outboard of the mounting flanges and with the second set of mounting apertures aligned with the anchoring apertures.
Figure 3:
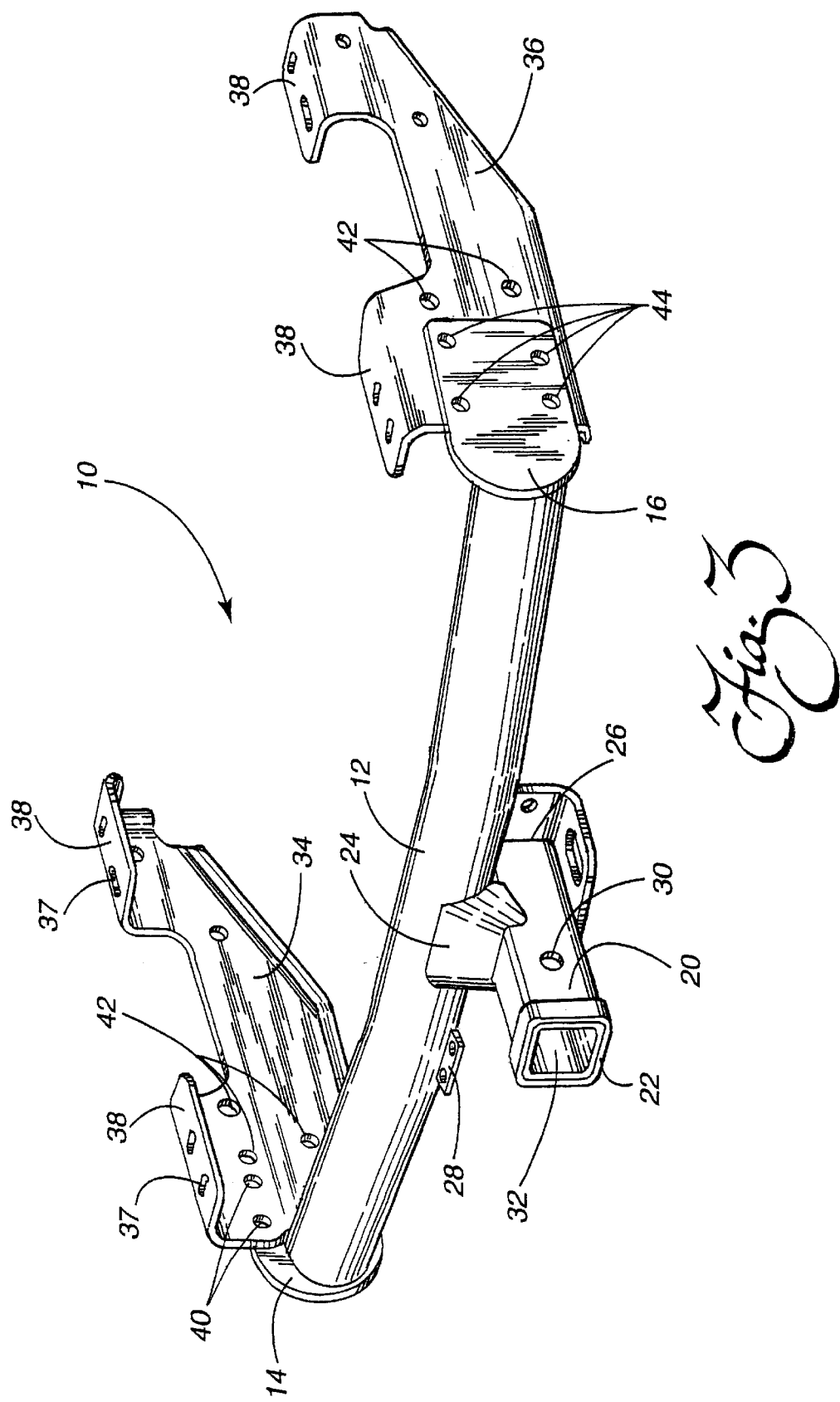
FIG. 3 is a perspective view similar to FIG. 1 but showing the mounting brackets mounted inboard of the mounting flanges, and once again with the first set of mounting apertures aligned with the anchoring apertures.

As best shown with reference to FIGS. 1–3, each of the mounting brackets 34, 36 includes a first mounting arrangement comprising a first set of four mounting apertures 40. Additionally, each mounting bracket 34, 36 includes a second mounting arrangement comprising a second set of four mounting apertures 42. It should be appreciated that one of the mounting apertures 40/42 is shared by each set. The first set of mounting apertures 40 define a first rectangular spacial arrangement. The second set of mounting apertures 42 define a second rectangular spacial arrangement identical in shape and orientation to the first rectangular arrangement but offset therefrom a given selected distance preferably between 1.970 and 2.030 inches. Further, it should be appreciated that each rectangular arrangement defined by the first mounting apertures 40 and the second mounting apertures 42 correspond exactly in shape and orientation to the arrangement of anchoring apertures 44 provided in each of the mounting flanges 14,16.

By aligning the first set of mounting apertures 40 of the mounting brackets 34, 36 with the anchoring apertures 44 in the first and second mounting flanges 14, 16, the mounting brackets are secured to the cross member 12 in a first selected position. Alternatively, by aligning the second set of mounting apertures 42 in the mounting brackets 34, 36 with the anchoring apertures 44 in the first and second mounting flanges 14, 16, the mounting brackets are mounted to the cross member 12 in a second alternative position. Accordingly, it should be appreciated that the present invention allows fore and aft adjustment of the relative position of the mounting brackets 34, 36 on the cross member 12.

It should be appreciated that in either of these positions, the cross member 12 is mounted in a cantilever fashion. This is because the cross member 12 is mounted to the mounting flanges 14, 16 adjacent a first or rear end thereof while all of the anchoring apertures 44 are provided adjacent a second or front end thereof: that is, all of the mounting apertures 44 are provided on the two mounting flanges 14, 16 in front of cross member 12. This structural arrangement advantageously allows for good hardware accessibility thereby simplifying vehicle installation. Further, this is accomplished while maintaining desirable hitch to body clearance. In addition, it provides good hitch box location.

Figure 4:
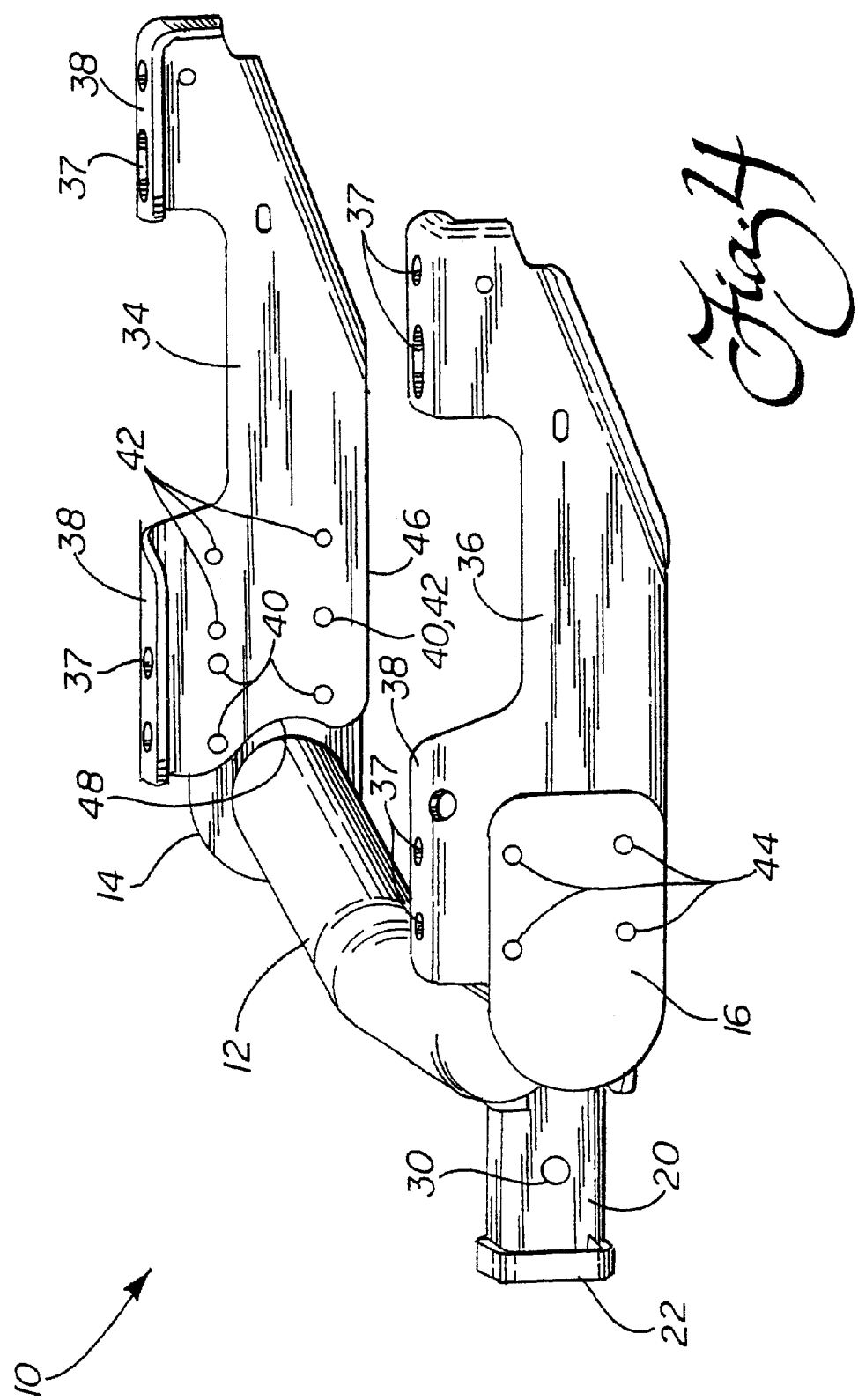
FIG. 4 is a rear side perspective view showing the clearance provided by the notch in the peripheral edge of one of the mounting brackets which allows the necessary clearance for the cross member and thus, the inboard mounting of the mounting brackets.
Figure 5:
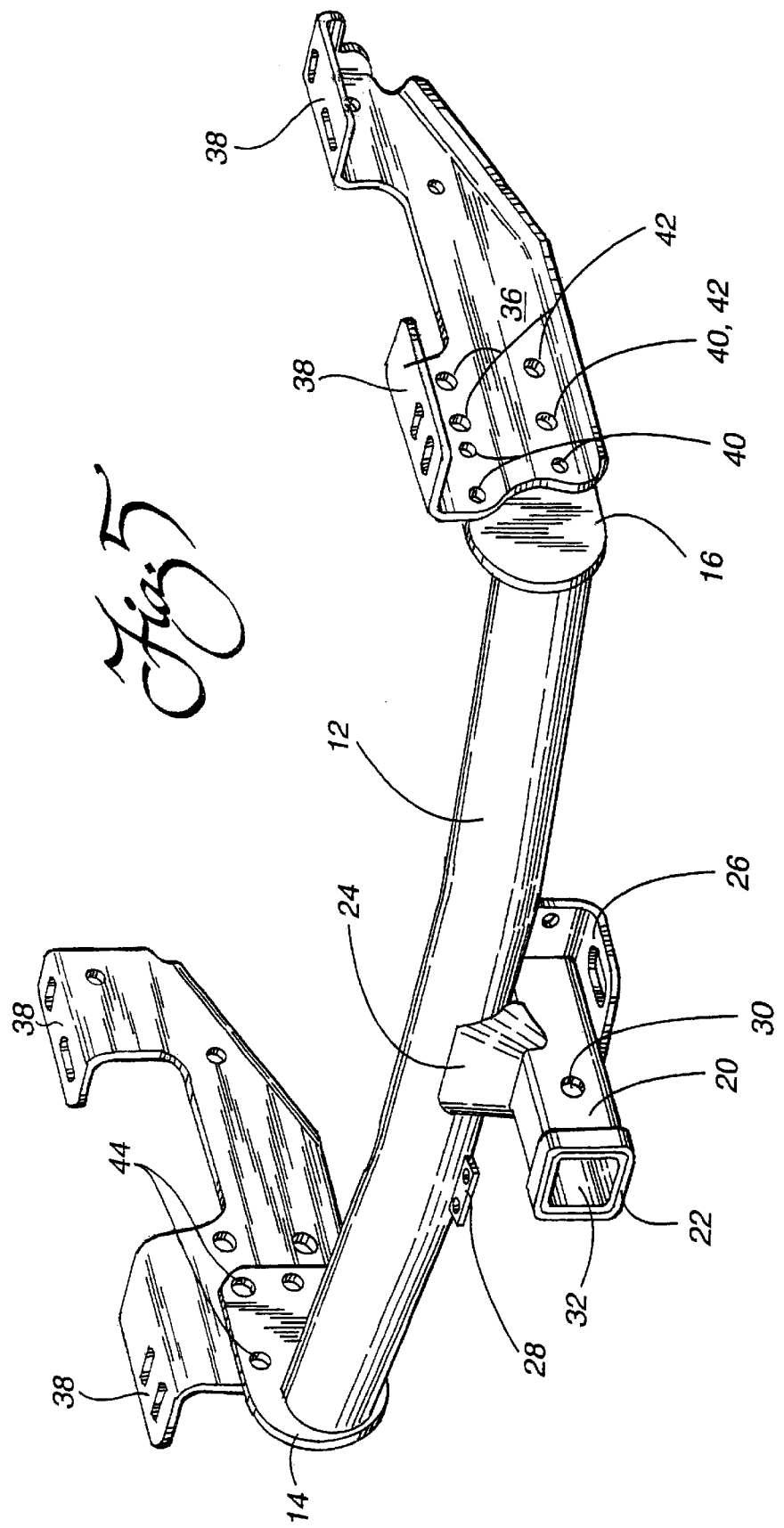
FIG. 5 is a perspective view similar to FIG. 1 with the mounting brackets reversed so that the mounting skirts point outward or away from each other.

Additionally, it should be appreciated with reference to FIGS. 1–3, the mounting brackets 34, 36 may be mounted outboard of the mounting flanges 14, 16 as shown in FIGS. 1,2 and 5 or inboard of the mounting flanges as shown in FIGS. 3 and 4. In order to allow inboard mounting, the peripheral edge 46 of each mounting bracket 34, 36 defines a notch 48. When mounted inboard as shown in FIG. 4, the notch 48 provides the necessary clearance for the edge of the mounting brackets 34, 36 to extend around the cross member 12 while allowing the first set of mounting apertures 40 to be aligned with the anchoring apertures 44 of the mounting flanges 14, 16.

In use, the hitch receiver installer first determines the model of the vehicle to which the trailer hitch receiver 10 is to be connected. He then reviews the equipment options and/or accessories on the vehicle particularly including any exhaust system and suspension system modifications which might affect the mounting of the trailer hitch receiver 10 to the vehicle frame.

After completing this background review, the mounting brackets, 34, 36 are secured to the cross member 12 in the desired fore or aft position and the desired inboard or outboard position. Further, the mounting brackets 34, 36 may be oriented as shown in FIGS. 1–4 with the mounting skirts 38 projecting inwardly toward each other or they may be reversed as shown in FIG. 5 with the mounting skirts 38 projecting outwardly away from each other. This allows additional side-to-side or span adjustment for mounting on vehicle frames of varying width.

If the mounting brackets 34, 36 are to be secured inboard of the mounting flanges 14, 16, the first set of mounting apertures 40 in the mounting brackets are aligned with the anchoring apertures 44 in the mounting flanges 14, 16 (see FIGS. 3 and 4). Fasteners in the form of bolts 50 and cooperating locknuts 52 are then used to secure the mounting brackets 34, 36 in the desired position.

Alternatively, if it is desired for mounting convenience and efficiency to secure the mounting brackets 34, 36 in an outboard position relative to the mounting flanges 14, 16, fore and aft adjustment is also possible. In the fore or first position, the first mounting apertures 40 are aligned with the anchoring apertures 44 and the bolts 50 and the locknuts 52 are utilized to secure them in position (see FIG. 2). In the aft or second position, the second mounting apertures 42 are aligned with the anchoring apertures 44 and the bolts 50 and cooperating locknuts 52 are utilized to secure them in position (see FIGS. 1 and 5). The inboard or outboard and fore or aft positioning of the mounting brackets 34, 36 with respect to the cross member 12 is dictated by the make, model and option or accessory packages of the towing vehicle. Whichever arrangement allows the most convenient and effective mounting of the trailer hitch receiver 10 to the frame of the towing vehicle is the one that is utilized. After the selection is made, the trailer hitch receiver 10 is lined up on the frame F and a drill is utilized to drill mounting openings O in the frame of the towing vehicle which are aligned with the mounting openings 37 in the mounting skirts 38. Fasteners 39, such as cooperating bolts and locknuts, are then utilized to complete the connection between the trailer hitch receiver 10 and the vehicle frame F. Specifically, the bolts are inserted through the openings 37 in the mounting skirts 38 and the cooperating openings cut in the vehicle frame. The locknuts are then tightened to secure the connection.

Of course, in any of these various mounting positions, the planar configuration of the mounting brackets 34, 36 insures a narrow transverse profile and the necessary clearance to fit into tight areas such as between vehicle exhaust, suspension and frame components. Further, since each of the mounting brackets 34, 36 is a unitary or single-piece component connected directly between the main frame member 11 and the vehicle frame rigid connection is insured.

In accordance with an additional aspect of the present invention, it should be appreciated that the receiver box 20 is mounted underneath the cross member 12. In prior art hitch receiver designs incorporating a cross member with a circular cross section the receiver box is mounted through the cross member. Numerous benefits result from the underneath mounting of the receiver box in accordance with the present invention.

Since the receiver box 20 projects below the cross member 12, the cross member may be mounted further up from the ground behind the body work of the towing vehicle. There it is less visible and this is more aesthetically pleasing. Additionally, the mounting brackets 34, 36 may be made with a lower height profile from less material. They are therefore cheaper to make and weigh less. As a result, the trailer hitch receiver 10 is relatively light weight and easier to manipulate during installation. Further, since the cross member 12 may be mounted closer to the vehicle frame, the centroid axis of the cross member is closer to the mounting points. As a result, the moment arm is shortened thereby reducing the stress and bending force applied to the brackets during towing.

Figure 6:
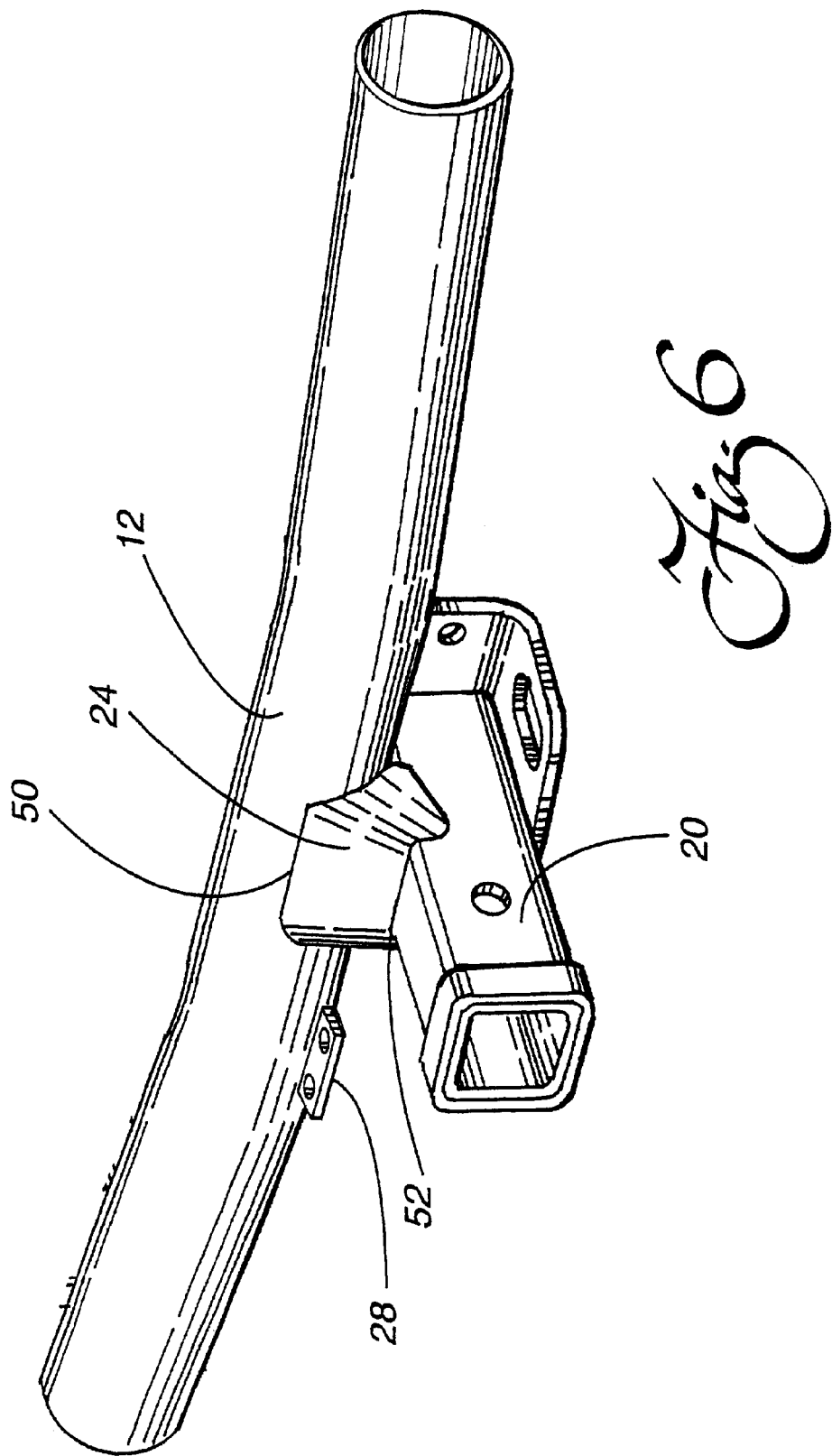
FIG. 6 is a detailed perspective view showing the mounting of the receiver box to the underside of the cross member through the mounting gusset.

The secure mounting of the receiver box 20 to the cross member 12 is primarily achieved through the mounting gusset 24 as shown in detail in FIG. 6. The mounting gusset 24 is formed to bring a contoured upper edge 50 into substantially continuous load bearing engagement with the cross member 12 and a contoured lower edge 52 into substantially continuous load bearing engagement with the upper and side walls of the receiver box 20. Weld points along the intersection of these edges 50, 52 with the cross member 12 and receiver box 20 complete a high integrity connection.

In summary, numerous benefits result from employing the concepts of the present invention. Advantageously, the design of the trailer hitch receiver 10 of the present invention allows the selective positioning of the mounting brackets 34, 36 on the cross member 12 either inboard or outboard of the mounting flanges 14, 16. Additionally, fore and aft adjustment is possible by aligning the first set of mounting apertures 40 or the second set of mounting apertures 42 in the mounting brackets 34, 36 with the anchoring apertures 44 in the mounting flanges 14, 16. Accordingly, adjustment in either of two substantially perpendicular directions is possible. In this way, significant mounting versatility is provided so that the trailer hitch receiver 10 of the present invention may be used for multiple applications; that is, on various makes, models and option and accessory equipped towing vehicles.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, while the drawing figures illustrate a trailer hitch receiver with the receiver box mounted underneath the cross member 12, it should be appreciated that the receiver box could either extend through or overlie the cross member. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A trailer hitch receiver for mounting to a frame of a motor vehicle, comprising:

a main frame member including a cross member, a first mounting flange and a second mounting flange, said first and second mounting flanges both having a series of anchoring apertures; and a pair of mounting brackets, each of said pair of mounting brackets being of unitary construction and including (a) a mounting skirt for engaging the frame of the motor vehicle, (b) a first set of mounting apertures and (c) a second set of mounting apertures a spaced distance from said first set of mounting apertures whereby said first set of mounting apertures are aligned with said anchoring apertures to allow said mounting brackets to be secured to said main frame member in a first position and said second set of mounting apertures are aligned with said anchoring apertures to allow said mounting brackets to be secured to said main frame member in a second position.

2. The trailer hitch receiver of claim 1, wherein each of said pair of mounting brackets includes two planar surfaces extending substantially perpendicular to one another.

3. The trailer hitch receiver of claim 1, wherein each of said pair of mounting brackets is at least in part substantially L-shaped in cross section including first and second planar surfaces substantially perpendicular to one another.

4. The trailer hitch receiver of claim 1, wherein said pair of opposed mounting brackets are mounted outboard of said mounting flanges.

5. The trailer hitch receiver of claim 1, wherein said pair of opposed mounting brackets are mounted inboard of said mounting flanges.

6. The trailer hitch receiver of claim 1, further including fasteners for securing said pair of mounting brackets to said mounting flanges by extending said fasteners through said series of anchoring apertures and either of said first set of mounting apertures or said second set of mounting apertures.

7. The trailer hitch receiver of claim 1, wherein said mounting brackets are reversible so that said mounting skirts extend inwardly, toward each other or outwardly, away from each other.

8. The trailer hitch receiver of claim 1 wherein said pair of mounting brackets are nontubular and are secured directly between said main frame member and the frame of the motor vehicle.

9. The trailer bitch receiver of claim 1, wherein said main frame member includes a round cross section.

10. A trailer hitch receiver for mounting to a frame of a motor vehicle, comprising:

a cross member;

first and second mounting flanges each having a series of anchoring apertures, each of said first and second mounting flanges engaging said cross member at a first end thereof and carrying said series of anchoring apertures at a second end thereof; and a pair of mounting brackets, each of said pair of mounting brackets including (a) a mourning skirt for engaging the frame of the motor vehicle, (b) a first set of mounting apertures and (c) a second set of mounting apertures a spaced distance from said first set of mounting apertures whereby said first set of mounting apertures are aligned with said anchoring apertures to allow said mounting brackets to be secured to said cross member in a first, fore position and said second set of mounting apertures are aligned with said anchoring apertures to allow said mounting brackets to be secured to said cross member in a second, aft position, said cross member being cantilever mounted in either of said first, fore and second, aft positions.

11. A method of constructing a multi-fit trailer hitch receiver for a vehicle; comprising:

providing a trailer hitch receiver with a structure allowing for both fore-and-aft and side-to-side mounting adjustment.

12. A method of constructing a multi-fit trailer hitch receiver for a vehicle; comprising:

providing a trailer hitch receiver with a cross member and adjustable mounting brackets;

providing means for adjusting said mounting brackets in a first direction; and providing means for adjusting said mounting brackets in a second direction substantially perpendicular to said first direction.

\* \* \* \* \*